(12) United States Patent
Ingleson

(10) Patent No.: US 7,456,955 B2
(45) Date of Patent: Nov. 25, 2008

(54) SPECTROPHOTOMETER WITH LIGHT EMITTING DIODE ILLUMINATOR

(75) Inventor: Alan Ingleson, Newbury (GB)

(73) Assignee: Datacolor Holding AG, Lucerne (CH)

( * ) Notice: Subject to any disclaimer, the term of this patent is extended or adjusted under 35 U.S.C. 154(b) by 286 days.

(21) Appl. No.: 11/371,839

(22) Filed: Mar. 8, 2006

(65) Prior Publication Data

US 2006/0203240 A1 Sep. 14, 2006

Related U.S. Application Data

(60) Provisional application No. 60/661,376, filed on Mar. 14, 2005.

(51) Int. Cl.
*G01J 3/42* (2006.01)
(52) U.S. Cl. ...................................... 356/319
(58) Field of Classification Search ................. 356/319, 356/323, 325
See application file for complete search history.

(56) References Cited

U.S. PATENT DOCUMENTS

| | | | |
|---|---|---|---|
| 5,754,283 A * | 5/1998 | Keane et al. ................... 356/73 |
| 5,764,352 A * | 6/1998 | Kappel et al. ............... 356/225 |
| 6,842,250 B2 | 1/2005 | Schwarz | |
| 6,844,931 B2 | 1/2005 | Ehbets | |
| 6,975,404 B2 | 12/2005 | Schwarz | |
| 2001/0055116 A1 | 12/2001 | Maczura et al. | |
| 2002/0145728 A1 | 10/2002 | Adams et al. | |
| 2002/0191183 A1 | 12/2002 | Tandon et al. | |

FOREIGN PATENT DOCUMENTS

WO   WO-02/093142 A   11/2002

OTHER PUBLICATIONS

The Communication Relating to the Results of the Partial International Search for PCT/IB2006/002275; received on Dec. 21, 2006, copy consists of 2 unnumbered pages.
Steven W. Brown, et al, "Development of a Tunable LED-Based Colormetric Source," Journal of Research of the National Institute of Standards and Technology, Jul.-Aug. 2002, pp. 363-371, vol. 107, No. 4, National Institute of Standards and Technology, Gaithersburg, MD 20899-0001.
Michael Brill, "LEDs: An Alternative Light Source," Sidebar for Quality Digest, http://www.qualitydigest.com/aug05/articles/01_article.shtml, Aug. 2005 pp. 1-6.
"BYK-Gardner Develops New Color Technology," Industry News, News Digest, Quality Digest, http://www.qualitydigest.com/dec98/html/newsdig.html, Dec. 1998 pp. 1-10.

* cited by examiner

*Primary Examiner*—F. L Evans

(57) ABSTRACT

In one embodiment, the invention is spectrophotometer with a light emitting diode illuminator. In one embodiment, a spectrophotometer for characterizing a reflectance spectrum of a specimen includes an optical assembly for illuminating the specimen, where the optical assembly includes at least one light emitting diode. A measurement head is coupled to the optical assembly for collecting light reflected by the specimen, and a spectrum analyzer is coupled to the measurement head for performing spectral analysis of the collected light into a plurality of spectral bands. A reference channel provides illumination from the optical assembly to the spectrum analyzer, while a test channel provides the collected light from the measurement head to the spectrum analyzer.

19 Claims, 4 Drawing Sheets

2

SPECTROPHOTOMETER WITH LIGHT EMITTING DIODE ILLUMINATOR

CROSS REFERENCE TO RELATED APPLICATIONS

This application claims the benefit of U.S. Provisional Patent Application No. 60/661,376, filed Mar. 14, 2005 (entitled "Spectrophotometer With Spectrum Analyzer In Which The Specimen Illuminator Comprises One Or More Light-Emitting Diodes"), which is herein incorporated by reference in its entirety.

FIELD OF THE INVENTION

The present invention relates generally to spectrophotometers and relates more specifically to illumination sources for use in spectrophotometers.

BACKGROUND OF THE DISCLOSURE

Spectrophotometers are commonly used in many industries to measure intensity as a function of the color, or more specifically, the wavelength of light. Typically, a spectrophotometer illuminates a specimen (which is either reflecting or transmitting) with a calibrated light source, and then measures the reflected light in order to characterize the specimen's reflectance spectrum.

Conventional spectrophotometers employ a pulsed xenon light source to illuminate specimens. While such light sources tend to be fairly reliable when properly maintained and filtered, they are also associated with many drawbacks. For instance, pulsed xenon light sources tend to be difficult to handle, physically, because they are relatively large, they produce dangerous voltages, they become very hot in use and they are electronically noisy. From a technical standpoint, they also tend to be slow (e.g., due to re-charging of capacitors after triggering), unstable (e.g., the plasma is geometrically unstable, making it difficult to couple energy into fiber optics easily), variable (e.g., different spectral power distributions may be produced from flash to flash), subject to inaccurate filtering (e.g., tends not to match required spectral power distributions) and difficult to couple closely with optics (e.g., due to extremely high pulsed energies). Moreover, the equipment is expensive, as is the filtering required to achieve many desired spectra of illumination. All of these drawbacks are associated with equipment that generally tends to have a short lifetime.

Some spectrophotometers have incorporated light emitting diode (LED) light sources in order to address some shortcomings associated with pulsed xenon light sources. In such configurations, however, each LED comprising the light source is capable of producing only one spectral measurement, since LED types are conventionally turned "on" one by one. Moreover, the characterization of a specimen's reflectance spectrum may be skewed by the transmittal of the LEDs' spectra (which are typically subject to complicated changes when their intensities are varied) to an analyzing device.

Thus, there is a need in the art for an improved spectrophotometer with an LED illuminator that allows for more precise measurement and characterization of a specimen's reflectance spectrum.

SUMMARY OF THE INVENTION

In one embodiment, the invention is spectrophotometer with a light emitting diode illuminator. In one embodiment, a spectrophotometer for characterizing a reflectance spectrum of a specimen includes an optical assembly for illuminating the specimen, where the optical assembly includes at least one light emitting diode. A measurement head is coupled to the optical assembly for collecting light reflected by the specimen, and a spectrum analyzer is coupled to the measurement head for performing spectral analysis of the collected light into a plurality of spectral bands. A reference channel provides illumination from the optical assembly to the spectrum analyzer, while a test channel provides the collected light from the measurement head to the spectrum analyzer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the invention is a spectrophotometer with an LED illuminator. Embodiments of the present invention provide for a spectrophotometer that illuminates specimens using an LED source, rather than a xenon source, thereby conveying advantages in terms of cost, reliability and physical practicality. Moreover, the spectrophotometer is capable of resolving light reflected by the specimen into a number of spectral bands, where the number of spectral bands is not limited by the number of LEDs used to illuminate the specimen.

Figure 1:
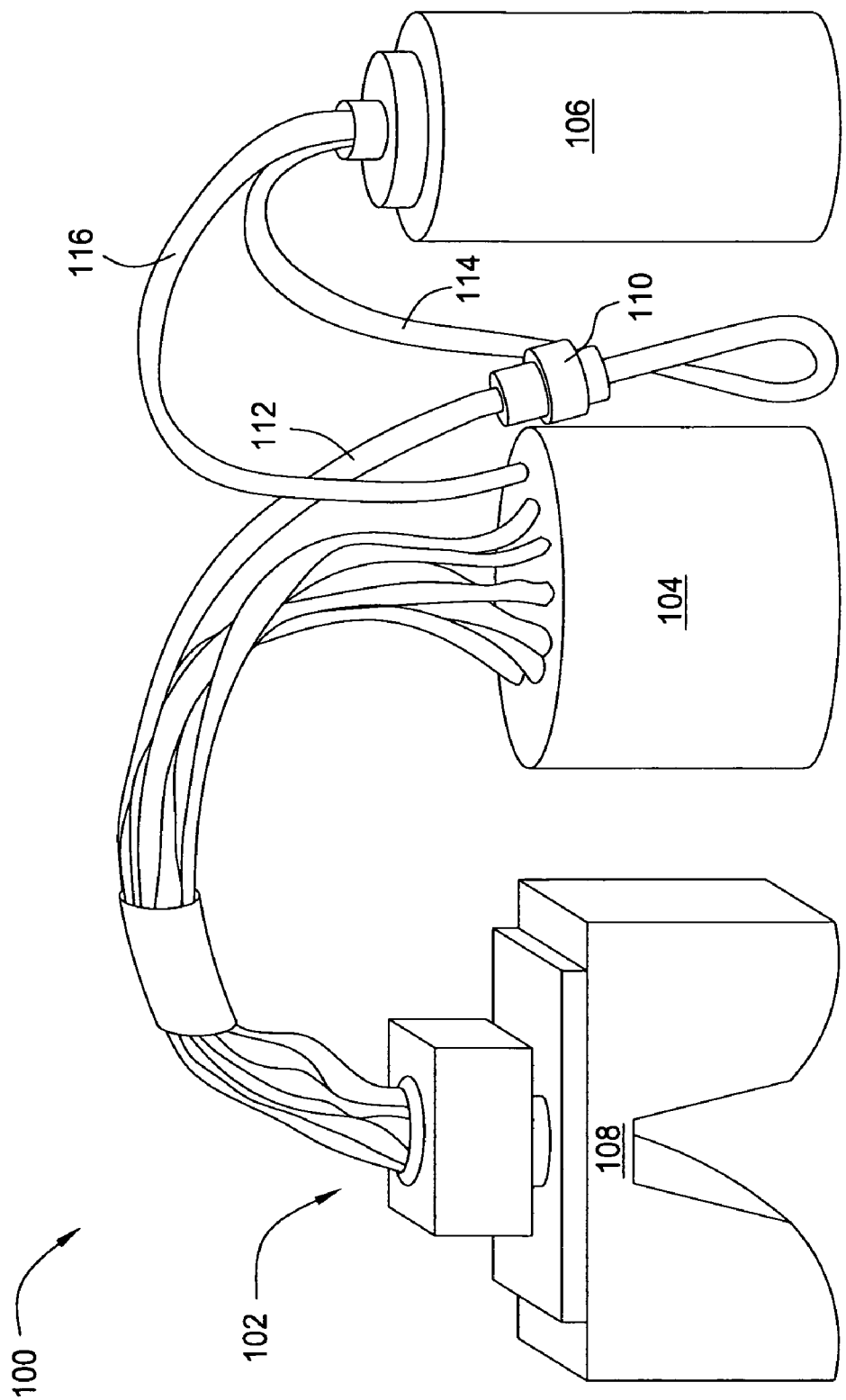
FIG. 1 is a schematic diagram illustrating one embodiment of a spectrophotometer, according to the present invention.

FIG. 1 is a schematic diagram illustrating one embodiment of a spectrophotometer 100, according to the present invention. The spectrophotometer 100 generally comprises a light emitting diode (LED) optical assembly 102, a measurement head 104 and a spectrum analyzer 106.

The LED optical assembly 102 is mounted to a mechanical mounting 108, which is in turn coupled to a power source (not shown) that provides power to the LED optical assembly. The LED optical 102 assembly is further coupled to the measurement head 104 and is configured to provide illumination to the measurement head 104.

The measurement head 104 is configured to direct the light provided by the LED optical assembly 102 so as to be incident upon a specimen being analyzed. In one embodiment, the measurement head 104 is a 45/0 measurement head (e.g., such that the spectrophotometer 100 operates in a 45/0 lighting/viewing geometry). In a further embodiment, the measurement head 104 is configured to homogenize light from a multiple-LED optical assembly and transport the light through both a test channel and a reference channel (i.e., such that intra-flash comparison is allowed). For instance, one exemplary spectrophotometer 45/0 measurement head that may be advantageously deployed in accordance with the present invention is described in U.S. patent application Ser. No. 10/916,762, which is herein incorporated by reference in its entirety.

The measurement head 104 is further coupled to the spectrum analyzer 106 and is configured to collect light that is reflected by the specimen and provide this light to the spectrum analyzer 106. The spectrum analyzer is configured to perform high-resolution spectral analysis of the collected light into spectral bands, so as to characterize the reflectance spectrum of the specimen. For the purposes of the present invention, the term "high resolution" refers to the ability of the spectrum analyzer 106 to precisely measure optical energy in narrow wavelength bands. In one embodiment, the spectrum analyzer 106 includes 256 sensors spreading from approximately 340 nm to approximately 800 nm and has a bandwidth of approximately 3.5 nm, which is converted to approximately 10 nm using external software. This achieves a resolution of better than approximately 0.01% in reflectance for samples having a reflectivity of less than approximately 5%, as well as an ability to measure up to approximately 120% "reflectance" (e.g., a fluorescent sample). In one embodiment, the spectrum analyzer 106 uses a diffraction grating or other functionally equivalent means to separate the collected light into bands.

Figure 2:
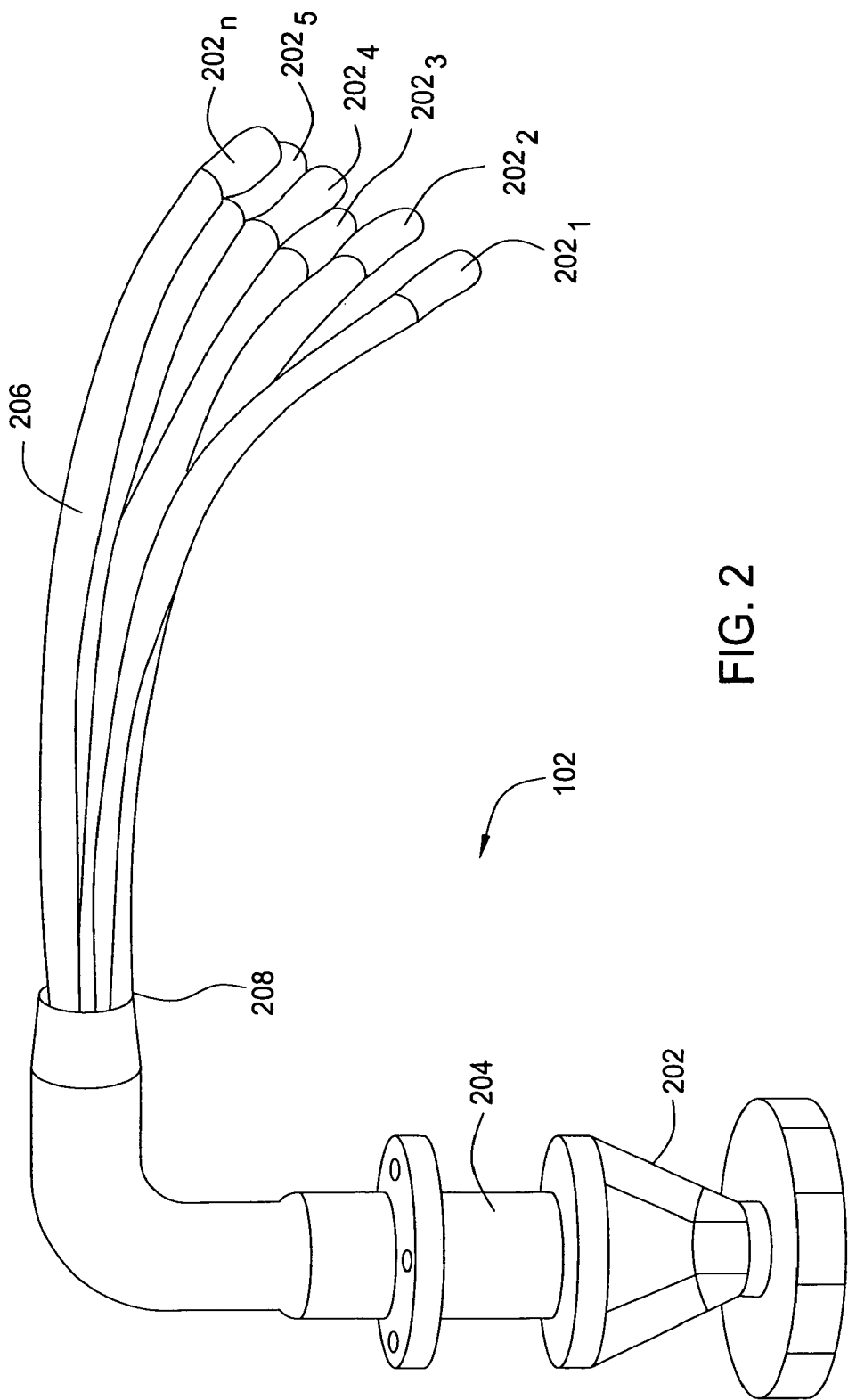
FIG. 2 is a schematic diagram illustrating one embodiment of the LED optical assembly illustrated in FIG. 1.

FIG. 2 is a schematic diagram illustrating one embodiment of the LED optical assembly 102 illustrated in FIG. 1. As described, the LED optical assembly 102 is configured to provide illumination to the measurement head 104, and in one embodiment comprises an illuminator 202, an optical coupler 204 and a fiber optic pigtail 206.

The illuminator 202 comprises at least one white light emitting diode (LED). In one embodiment, the illuminator 202 is configured to produce flashed light of substantially the same effective power as a standard xenon flash conventionally used in spectrophotometry applications. In one embodiment, the illuminator 202 comprises a single white LED. In another embodiment, the illuminator 202 comprises a bank of white LEDs, where each individual LED is independently controllable. In a further embodiment still, the illuminator 202 comprises a chip-set array of nine LEDs, which arranges the nine LEDs in a small space that allows for easy mixing of light. For a compact (e.g., handheld) spectrophotometer assembly, the bank of LEDs may comprise a collection of small LED dies. In yet another embodiment, the illuminator 202 further comprises at least one of: one or more ultraviolet LEDs (e.g., for assessing the fluorescence of a specimen) or one or more infrared LEDs (e.g., for producing measurable wavelengths above 700 nm).

The illuminator 202 is coupled, via the optical coupler 204, to the fiber optic pigtail 206. In one embodiment, the optical coupler 204 is an optical-grade plastic coupler.

The fiber optic pigtail 206 comprises a plurality of bundles $202_1$-$202_n$ (hereinafter collectively referred to as "bundles 202") of optical fibers having one common end 208 where all of the bundles 202 are fixed or "gathered" together. Each of the bundles 202 additionally has a free end that is independent of the other bundles 202. In one embodiment, the fiber optic pigtail 206 comprises seven bundles 202 of optical fibers. The precise number of bundles 202 comprising the fiber optic pigtail 206 will depend on a given application. For example, a greater number of illumination channels (e.g., bundles 202) will produce more uniform illumination, allowing orientation-sensitive specimens to be measured more accurately. However, a smaller number of illumination channels allows for a more compact assembly (i.e., the greater the number of bundles 202, the larger the measurement head 104 will need to be in order to accommodate the bundles 202, as described in greater detail below).

Referring back to FIG. 1, the LED optical assembly 102 is coupled, at the illuminator end, to the mechanical mounting 108, which, as described above, is configured to provide power from a power source to the LED optical assembly 102. In turn, all but one (e.g., six in the present example) of the bundles 202 of the fiber optic pigtail 206 are coupled, via their respective free ends, to the measurement head 104 in a symmetric manner. These bundles 202 are referred to as the "specimen illumination diffuser/attenuator fibers" and provide light from the illuminator 202 to the measurement head 104 for illuminating a specimen. The remaining (e.g., seventh) bundle 202 is coupled to the spectrum analyzer 106. In one embodiment, the remaining bundle 202 is interrupted by a transmitting diffuser 110 before reaching the spectrum analyzer 106, thereby dividing the remaining bundle 202 into a first portion 112 and a second portion 114. The first portion 112, which extends from the common end 208 of the fiber optic pigtail 206 to the diffuser 110, is referred to as the "reference fiber" and carries reference illumination (i.e., as opposed to illumination that has been reflected by a specimen); the second portion 114, which extends from the diffuser 110 to the spectrum analyzer 106, is referred to as the "conditioned reference fiber" and carriers conditioned (i.e., by the diffuser 110) reference illumination. A final bundle 116 of optical fibers, which is not part of the fiber optic pigtail 206, extends from the measurement head 104 to the spectrum analyzer 106 (i.e., for carrying reflected light from a specimen to the spectrum analyzer 106) and is referred to as the "specimen fiber" or "test fiber".

In operation, the white LED illuminator 202 is flashed into the optical coupler 204, which in turn focuses the light onto the common end 208 of the fiber optic pigtail 206 such that the common end 208 of the fiber optic pigtail 206 is illuminated. The illumination is provided to the measurement head 104 via the specimen illumination diffuser fibers 202, and the specimen is illuminated. The light reflected by the specimen is then conveyed to the spectrum analyzer 106 via the specimen fiber 116, while diffused illumination from the LED optical assembly 102 is provided to the spectrum analyzer 106 by the conditioned reference fiber 114. The spectrum analyzer 106 then measures and characterizes the reflected light (i.e., in conjunction with the diffused illumination in the conditioned reference fiber 114).

The use of white LEDs to produce illumination conveys several advantages over the use of conventional pulsed xenon light sources (e.g., xenon-arc lamps). For one, an LED illuminator consumes less power than a xenon illuminator. This is attributable to several factors. Firstly, LEDs are directional, while xenon-arc lamps are not (e.g., white box-like housings are often used to reflect additional light from the xenon-arc lamp into the measurement head); thus, less light is wasted (i.e., fiber optic coupling efficiency is also improved). Secondly, a white LED contains less power in unwanted bands than a xenon-arc lamp does, and can thus be deployed closer, physically, to the measurement head without damaging the optical elements. Thirdly, an LED is smaller than a xenon-arc lamp and thus does not require as large an aperture. For example, a typical aperture required for a xenon-arc lamp is approximately 25 $mm^2$ in diameter, commensurate with an instrument standoff distance of approximately 25 mm from the illuminant port. This can be compared with the practical minimum aperture size of approximately 10 $mm^2$ in diameter for the same instrument standoff for an LED.

Additionally, a spectrophotometer incorporating a white LED illuminator is easier to handle, physically, than a spectrophotometer incorporating a xenon illuminator. For one, a white LED (which is typically rated at up to 120 degrees Celsius and rarely becomes even that hot) is substantially cooler than a xenon illuminator. Moreover, the use of LEDs renders unnecessary circuitry that is typically required to slow down the emittance of light from a xenon illuminator (which emits all of its light over a brief time period). This circuitry tends to change the spectral power distribution, as well as lower efficiency and produce large amounts of unwanted electrical noise.

LED sources also tend to be significantly less expensive than pulsed-xenon sources and to have longer life spans than pulsed-xenon light sources. The stable lifetime of an LED typically begins after a few hours of "burn-in", in which a rapid transient of spectral change occurs. In addition, white light LEDs tend to require less filtering than do xenon-arc lamps in order to reduce trace undesirable ultraviolet or infrared radiation.

Furthermore, LEDs tend to be substantially less intense than xenon-arc lamps, resulting in less triplet absorption in specimens. Triplet absorption is undesirable, as it can cause the reflectance of a specimen to become nonlinear in light intensity. In this case, the pulse emitted form the illuminator (e.g., a xenon-arc lamp) must be stretched out in time to reduce the photon flux to the linear range of the reflecting specimen.

In addition, because LEDs produce more spatially stable output than pulsed xenon sources, the coupling of energy into the fiber optics of the spectrophotometer is much more repeatable.

Moreover, in embodiments where the illuminator comprises a bank of multiple LEDs (as opposed to a single white LED) that are independently controllable, the bank of LEDs can be implemented to produce a spectral power distribution that closely matches a required spectrum, by shaping the spectral power distribution through the duration that each individual LED is "on" (thereby eliminating the need for filtering). In this manner, it is possible to approximate various spectra (including, for example, true D65) that normally can not be approximated using pulsed xenon illumination.

In a further embodiment of the multiple LED illuminator configuration, optical mixing of the LED light can be achieved through arrangement about the LED bank's optical axis, for example as described in U.S. Pat. No. 6,147,761, U.S. Pat. No. 6,020,583 and U.S. Pat. No. 5,963,333.

In a further embodiment still, where the spectrum analyzer 106 is a traditional spectrum analyzer (e.g., one that separates the received spectrum into spectral bands even if the spectrum illuminates the specimen all at once, such as a diffraction grating), the multiple LEDs can be turned on simultaneously without reducing the resolution of the spectral information conveyed by the spectrophotometer 100. In such a case, the LEDs are turned on simultaneously, and then the LEDs' current waveforms in time (during the duration for which the LEDs are on, and also during peak current) are modulated to approximate a desired spectral power distribution. Moreover, the number of spectral bands into which the spectrum analyzer 106 separates the received spectrum is not limited by the number of LEDs that the illuminator 202 comprises.

In the multiple-LED illuminator embodiment that includes ultraviolet LEDs in addition to white LEDs, aging of the optics at the entry to the spectrophotometer can be lessened by turning the ultraviolet LEDs (which radiate down to 275 nm of wavelength) only occasionally and only as much as needed. By contrast, the use of ultraviolet illumination in conjunction with a conventional xenon light source tends to more rapidly age the optics at the entry to the spectrophotometer, as the ultraviolet light is not controlled and must be filtered out to achieve a state of "ultraviolet not included". This unwanted ultraviolet light ages and yellows the optics at the entry to the spectrophotometer.

Moreover, the provision of homogenized illumination to the spectrum analyzer 106 via both a test channel (e.g., specimen fiber 116) and a reference channel (e.g., reference fiber 112/conditioned reference fiber 114) allows for intra-flash comparison of the illumination provided by the LED(s) and the illumination reflected by the specimen (i.e., illumination produced by the LED(s) is measurable at the same time as illumination reflected by the specimen). This comparison "cancels out" the spectrum of the LED(s) (which is subject to complicated changes when its intensity varies through electrical current control), allowing for more precise characterization of the specimen's reflectance spectrum. Conventional spectrophotometers that include multiple individual channels for LED-produced illumination do not typically include a reference channel, and thus can not provide this advantage.

Those skilled in the art will appreciate the spectrophotometer 100 may be assembled in alternate configurations that do not require one or more of the components illustrated in FIG. 1, without departing from the scope of the present invention. For example, a compact or hand-held spectrophotometer may be assembled that includes a white LED illumination source and a spectrum analyzer, but does not require an optical coupler in the LED optical assembly.

Figure 3:
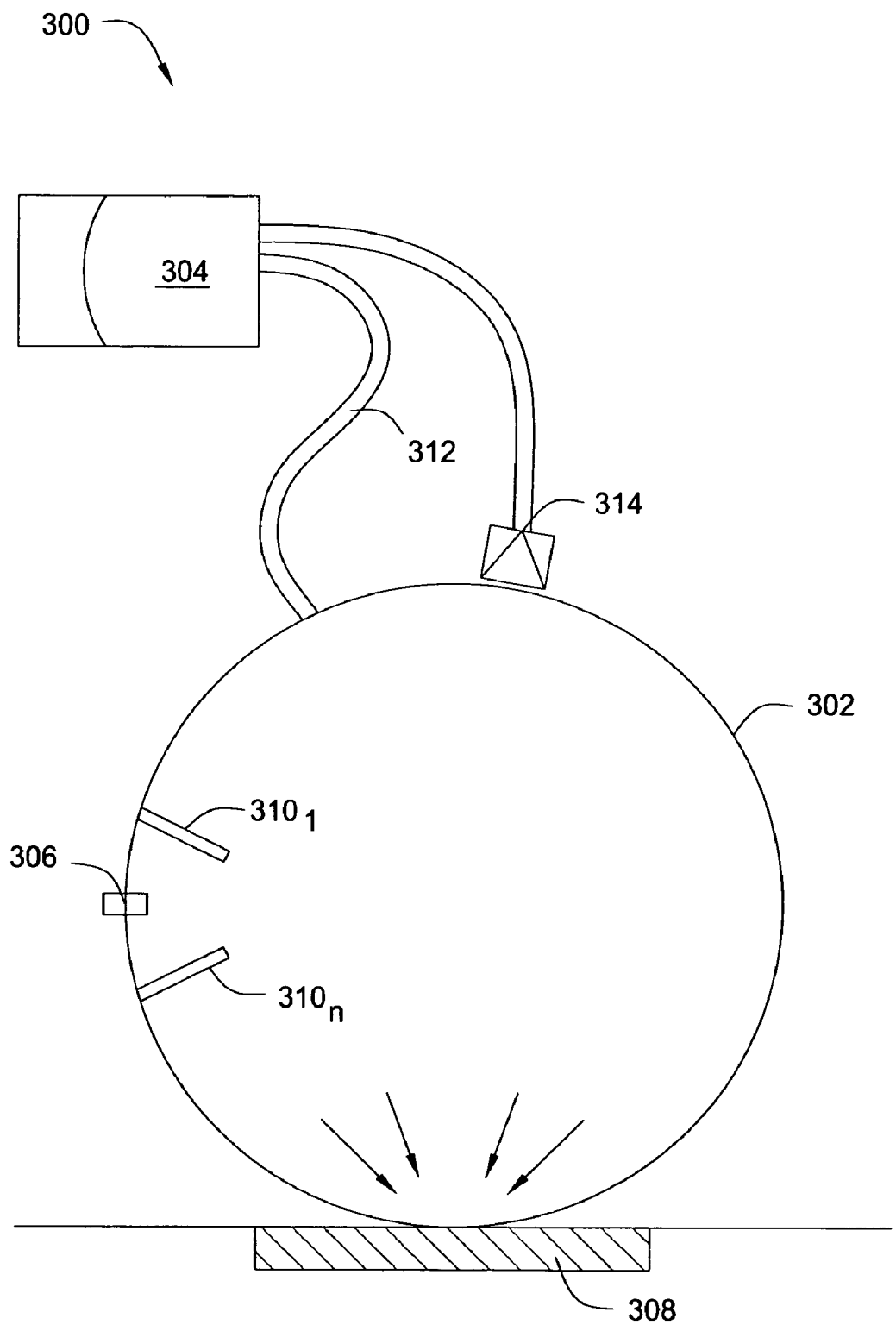
FIG. 3 is a schematic diagram illustrating another embodiment of a spectrophotometer, according to the present invention.

FIG. 3 is a schematic diagram illustrating another embodiment of a spectrophotometer 300, according to the present invention. Specifically, the spectrophotometer 300 is an integrating-sphere spectrophotometer. In essence, the integrating-sphere spectrophotometer replaces the assembly of FIG. 1 from the fiber optic pigtail 206, onward (including the measurement head 104). One exemplary integrating-sphere spectrophotometer that may be advantageously deployed in accordance with the present invention is described in U.S. patent application Ser. No. 11/050,408, which is herein incorporated by reference in its entirety.

The spectrophotometer 300 generally comprises a diffusing sphere 302, a spectrum analyzer 304, an illuminator 306 and a specimen port 308.

The specimen port 308 is configured for supporting a specimen for analysis and is directly coupled to the diffusing sphere 302, which is substantially spherical in shape.

The illuminator 306 is directly coupled to the diffusing sphere 302 and comprises one or more white LEDs (e.g., a single white LED or an array of LEDs) and one or more baffles $310_1$-$310_n$ (hereinafter collectively referred to as "baffles 310") positioned proximate to the LED(s) in order to reduce the occurrence of direct paths of light from the illuminator 306 to a specimen or detector. In one embodiment, the illuminator 306 further comprises a secondary steady light source (e.g., for enabling assessment of a specimen in situ, as by a digital camera), as described in U.S. patent application Ser. No. 11/016,033, which is herein incorporated by reference in its entirety. In such an embodiment, LEDs would be implemented to provide illumination continuously at low power, as well as intensely in pulses.

The spectrum analyzer 304 is coupled to the diffusing sphere 302 via a reference channel 312 and collection optics 314. In one embodiment, at least one of the reference channel 312 and the collection optics 314 comprises one or more bundles of optical fibers.

In addition to the advantages described above (e.g., decreased power consumption, cooler illumination sources, etc.), the use of white LED illumination sources translates into to further benefits when deployed in conjunction with an integrating-sphere spectrophotometer configuration. For instance, the decrease in power consumption is more pronounced, as the smaller aperture size required by the white LED also allows for smaller baffles in the integrating-sphere embodiment, thereby rendering the diffusing sphere more completely and isotropically diffusing and also improving the accuracy of measurement of anisotropic specimens.

As an example, consider an integrating-sphere spectrophotometer incorporating a xenon illuminator that applies a 15-Joule 1-msec pulse, resulting in a peak power of approximately 15,000 watts. In contrast, were the same spectrophotometer to incorporate a white LED illuminator (i.e., comprising a single white LED or an array of white LEDs) that applies a 0.4-Joule, 70-msec pulse, experimental results show that the resultant peak power would be closer to approximately six watts.

Figure 4:
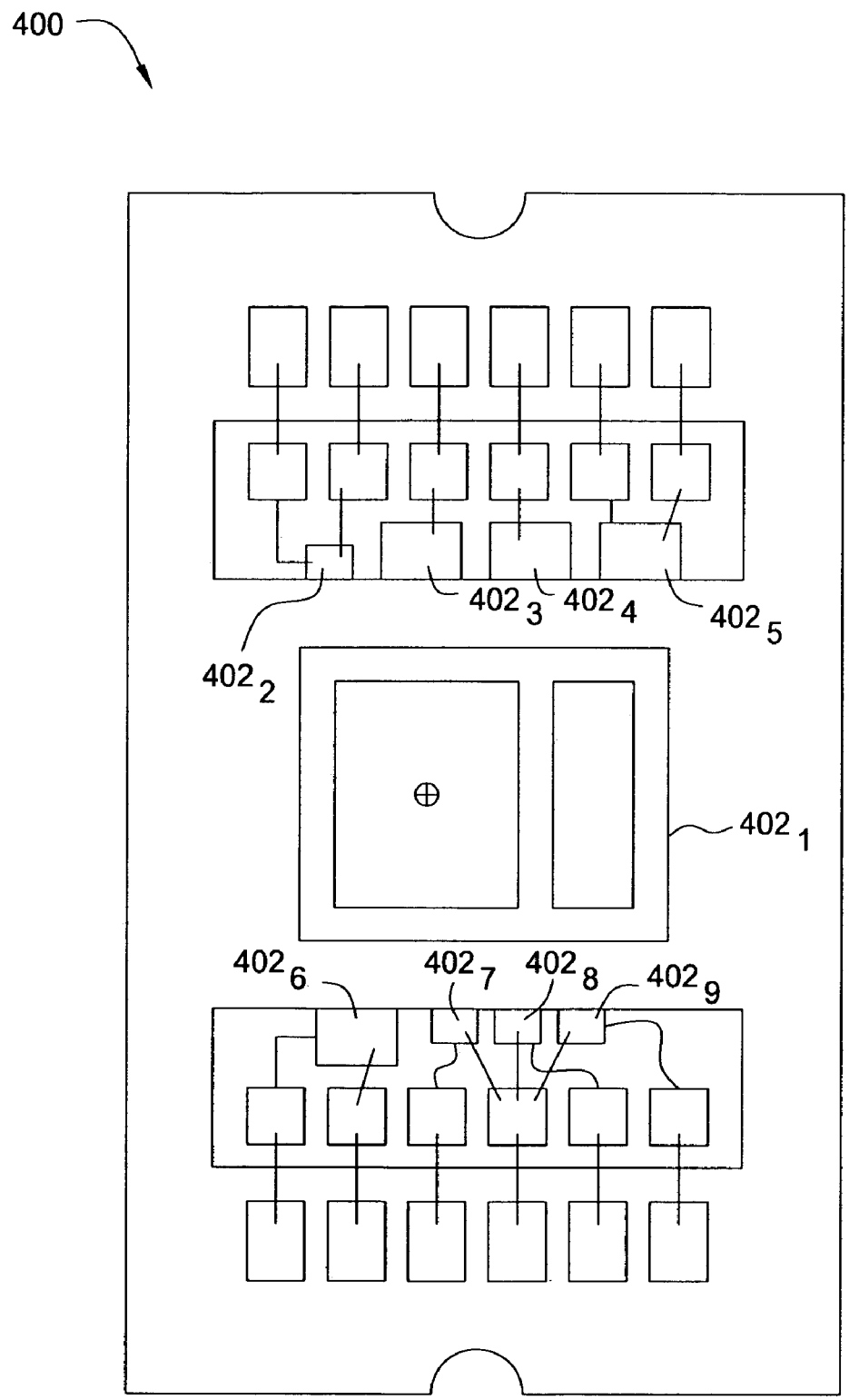
FIG. 4 is a schematic diagram of one embodiment of an illuminator that may advantageously deployed in accordance with the present invention.

FIG. 4 is a schematic diagram of one embodiment of an illuminator 400 that may advantageously deployed in accordance with the present invention (e.g., as the illuminator 202 of FIG. 2 or the illuminator 306 of FIG. 3). Specifically, the illuminator 400 is a chip-set array of LEDs.

The illuminator 400 in particular comprises nine LEDs $402_1$-$402_9$ (hereinafter collectively referred to as "LEDs 402"): a first, largest LED $402_1$ positioned substantially in the center of the chip set and four smaller LEDs $402_2$-$402_9$ positioned on opposite sides of the first LED $402_1$.

Thus, the present invention represents a significant advancement in the field of spectrophotometry. As described above, the use of an LED source, rather than a xenon source, to illuminate a specimen conveys advantages in terms of cost, reliability and physical practicality. Moreover, the spectrophotometer is capable of resolving light reflected by the specimen into a number of spectral bands, where the number of spectral bands is not limited by the number of LEDs used to illuminate the specimen.

Although various embodiments which incorporate the teachings of the present invention have been shown and described in detail herein, those skilled in the art can readily devise many other varied embodiments that still incorporate these teachings.

What is claimed is:

1. A spectrophotometer for characterizing a reflectance spectrum of a specimen, the spectrophotometer comprising:
   an optical assembly for illuminating specimen, the optical assembly comprising at least one light emitting diode and a fiber optic pigtail coupled to said at least one light emitting diode, said fiber optic pigtail comprising a plurality of bundles of optical fibers, each of said plurality of bundles sharing a common end and additionally having one free end that is independent of a remainder of said plurality of bundles;
   a measurement head coupled to said optical assembly for collecting light reflected by said specimen;
   a spectrum analyzer coupled to said measurement head for performing spectral analysis of said light into a plurality of spectral bands;
   a reference channel for providing illumination from said optical assembly to said spectrum analyzer; and
   a test channel for providing said light from said measurement head to said spectrum analyzer.

2. The spectrophotometer of claim 1, wherein said plurality of bundles comprises seven bundles.

3. The spectrophotometer of claim 1, wherein said common end couples said fiber optic pigtail to said at least one light emitting diode.

4. The spectrophotometer of claim 1, wherein all but one of said plurality of bundles are coupled, at said respective free ends, to said measurement head, and said reference channel comprises a remaining one of said plurality of bundles that is coupled, at said free end, to said spectrum analyzer.

5. The spectrophotometer of claim 4, wherein said all but one of said plurality of bundles are configured to collectively provide light to illuminate said specimen.

6. The spectrophotometer of claim 4, further comprising:
   a transmitting diffuser coupled to said reference channel, such that said reference channel comprises:
      a first portion extending from said common end to said transmitting diffuser; and
      a second portion extending from said transmitting diffuser to said spectrum analyzer.

7. The spectrophotometer of claim 6, wherein said first portion is configured to carry reference illumination.

8. The spectrophotometer of claim 6, wherein said second portion is configured to carry conditioned reference illumination.

9. The spectrophotometer of claim 1, wherein said measurement head is a diffusing sphere.

10. The spectrophotometer of claim 9, wherein said optical assembly further comprises:
    at least one baffle positioned to block a direct path of light from said at least one light emitting diode to said specimen.

11. The spectrophotometer of claim 1, wherein said at least one light emitting diode comprises a plurality of independently controllable light emitting diodes.

12. The spectrophotometer of claim 11, wherein said plurality of independently controllable light emitting diodes are configured to shape a spectral power distribution.

13. The spectrophotometer of claim 11, wherein at least one of said plurality of independently controllable light emitting diodes is configured to produce continuous illumination.

14. The spectrophotometer of claim 11, wherein at least one of said plurality of independently controllable light emitting diodes is configured to shape produce pulsed illumination.

15. The spectrophotometer of claim 1, wherein said at least one light emitting diode comprises a chip-set army of nine light emitting diodes.

16. The spectrophotometer of claim 1, wherein said spectrum analyzer comprises a diffraction grating.

17. The spectrophotometer of claim 1, wherein said at least one light emitting diode is a white light emitting diode.

18. The spectrophotometer of claim 17, wherein said at least one light emitting diode further comprises at least one of: an ultraviolet light emitting diode or an infrared light emitting diode.

19. A spectrophotometer for characterizing a reflectance spectrum of a specimen, the spectrophotometer comprising:
means for illuminating said specimen, said illuminating means comprising at least one light emitting diode and a fiber optic pigtail coupled to said at least one light emitting diode, said fiber optic pigtail comprising a plurality of bundles of optical fibers, each of said plurality of bundles sharing a common end and additionally having one free end that is independent of a remainder of said plurality of bundles;
means for collecting light reflected by said specimen;
means for performing spectral analysis of said light into a plurality of spectral bands;
means for providing illumination from said optical assembly to said spectrum analyzer; and
means for providing said light from said measurement head to said spectrum analyzer.

* * * * *